(12) United States Patent
Tran et al.

(10) Patent No.: US 12,478,425 B2
(45) Date of Patent: Nov. 25, 2025

(54) NEUROMODULATION CATHETERS HAVING JACKETED NEUROMODULATION ELEMENTS AND RELATED DEVICES, SYSTEMS, AND METHODS

(71) Applicant: Medtronic Ireland Manufacturing Unlimited Company, Dublin (IE)

(72) Inventors: Don Tran, Novato, CA (US); Rudy Beasley, Rohnert Park, CA (US); Jaime Rios, Santa Rosa, CA (US); Sukyoung Shin, Santa Rosa, CA (US); Sina Som, Santa Rosa, CA (US)

(73) Assignee: Medtronic Ireland Manufacturing Unlimited Company, Dublin (IE)

( * ) Notice: Subject to any disclaimer, the term of this patent is extended or adjusted under 35 U.S.C. 154(b) by 1098 days.

(21) Appl. No.: 17/484,186

(22) Filed: Sep. 24, 2021

(65) Prior Publication Data

US 2022/0008127 A1 Jan. 13, 2022

Related U.S. Application Data

(63) Continuation of application No. 16/229,147, filed on Dec. 21, 2018, now Pat. No. 11,154,353, which is a
(Continued)

(51) Int. Cl.
*A61B 18/14* (2006.01)
*A61B 18/00* (2006.01)
(Continued)

(52) U.S. Cl.
CPC ............ *A61B 18/1492* (2013.01); *A61N 1/28* (2013.01); *A61N 1/36117* (2013.01);
(Continued)

(58) Field of Classification Search
CPC ...... A61B 18/1492; A61B 2018/00166; A61B 2018/00214; A61B 2018/0022;
(Continued)

(56) References Cited

U.S. PATENT DOCUMENTS

| | | | | |
|---|---|---|---|---|
| 7,620,451 | B2 * | 11/2009 | Demarais | A61N 1/36007 607/9 |
| 10,166,069 | B2 * | 1/2019 | Tran | A61N 1/28 |
| 2012/0303054 | A1 * | 11/2012 | Wilson | B29C 55/22 156/294 |

* cited by examiner

*Primary Examiner* — Lindsey G Wehrheim
(74) *Attorney, Agent, or Firm* — Shumaker & Sieffert, P.A.

(57) ABSTRACT

A neuromodulation catheter in accordance with a particular embodiment includes an elongate shaft and a neuromodulation element operably connected to the shaft. The shaft includes a proximal hypotube segment at its proximal end portion and a jacket disposed around at least a portion of an outer surface of the hypotube segment. The jacket may be made at least partially of a polymer blend including polyether block amide and polysiloxane. The neuromodulation element includes a distal hypotube segment and a tubular jacket disposed around at least a portion of an outer surface of the distal hypotube segment. The jacket has reduced-diameter segments spaced apart along its longitudinal axis. The neuromodulation element further includes band electrodes respectively seated in the reduced-diameter segments and respectively forming closed loops extending circumferentially around the jacket.

20 Claims, 9 Drawing Sheets

Related U.S. Application Data continuation of application No. 14/606,821, filed on Jan. 27, 2015, now Pat. No. 10,166,069.

(60) Provisional application No. 61/932,224, filed on Jan. 27, 2014.

(51) Int. Cl.
*A61N 1/28* (2006.01)
*A61N 1/36* (2006.01)
*B29C 45/00* (2006.01)
*B29C 45/14* (2006.01)
*B29L 31/00* (2006.01)

(52) U.S. Cl.
CPC .... *B29C 45/0055* (2013.01); *B29C 45/14598* (2013.01); *A61B 2018/00166* (2013.01); *A61B 2018/00214* (2013.01); *A61B 2018/0022* (2013.01); *A61B 2018/00404* (2013.01); *A61B 2018/00434* (2013.01); *A61B 2018/00505* (2013.01); *A61B 2018/00511* (2013.01); *A61B 2018/00577* (2013.01); *A61B 2018/1467* (2013.01); *B29L 2031/7542* (2013.01); *Y10T 29/49002* (2015.01)

(58) Field of Classification Search
CPC .. A61B 2018/0044; A61B 2018/00434; A61B 2018/00505; A61B 2018/00511; A61B 2018/00577; A61B 2018/1467; A61N 1/28; A61N 1/36117; B29C 45/0055; B29C 45/14598; Y10T 29/49002; B29L 2031/7542

See application file for complete search history.

NEUROMODULATION CATHETERS HAVING JACKETED NEUROMODULATION ELEMENTS AND RELATED DEVICES, SYSTEMS, AND METHODS

CROSS-REFERENCE TO RELATED APPLICATION(S)

This application is a continuation of U.S. patent application Ser. No. 16/229,147, filed on Dec. 21, 2018, and entitled, "NEUROMODULATION CATHETERS HAVING JACKETED NEUROMODULATION ELEMENTS AND RELATED DEVICES, SYSTEMS. AND METHODS," which is a continuation of U.S. patent application Ser. No. 14/606,821, filed on Jan. 27, 2015, and entitled, "NEUROMODULATION CATHETERS HAVING JACKETED NEUROMODULATION ELEMENTS AND RELATED DEVICES, SYSTEMS, AND METHODS," now U.S. Pat. No. 10,166,069, which claims the benefit of U.S. Provisional Patent Application No. 61/932,224, filed on Jan. 27, 2014, the disclosure of each which is incorporated herein by reference in its entirety.

TECHNICAL FIELD

The present technology is related to catheters. In particular, at least some embodiments are related to neuromodulation catheters including neuromodulation elements configured to deliver energy to nerves at or near a treatment location within a body lumen.

BACKGROUND

The sympathetic nervous system (SNS) is a primarily involuntary bodily control system typically associated with stress responses. Fibers of the SNS extend through tissue in almost every organ system of the human body and can affect characteristics such as pupil diameter, gut motility, and urinary output. Such regulation can have adaptive utility in maintaining homeostasis or in preparing the body for rapid response to environmental factors. Chronic activation of the SNS, however, is a common maladaptive response that can drive the progression of many disease states. Excessive activation of the renal SNS, in particular, has been identified experimentally and in humans as a likely contributor to the complex pathophysiologies of hypertension, states of volume overload (e.g., heart failure), and progressive renal disease.

Sympathetic nerves of the kidneys terminate in the renal blood vessels, the juxtaglomerular apparatus, and the renal tubules, among other structures. Stimulation of the renal sympathetic nerves can cause, for example, increased renin release, increased sodium reabsorption, and reduced renal blood flow. These and other neural-regulated components of renal function are considerably stimulated in disease states characterized by heightened sympathetic tone. For example, reduced renal blood flow and glomerular filtration rate as a result of renal sympathetic efferent stimulation is likely a cornerstone of the loss of renal function in cardio-renal syndrome (i.e., renal dysfunction as a progressive complication of chronic heart failure). Pharmacologic strategies to thwart the consequences of renal sympathetic stimulation include centrally-acting sympatholytic drugs, beta blockers (e.g., to reduce renin release), angiotensin-converting enzyme inhibitors and receptor blockers (e.g., to block the action of angiotensin II and aldosterone activation consequent to renin release), and diuretics (e.g., to counter renal sympathetic mediated sodium and water retention). These pharmacologic strategies, however, have significant limitations including limited efficacy, compliance issues, side effects, and others.

BRIEF DESCRIPTION OF THE DRAWINGS

Many aspects of the present technology can be better understood with reference to the following drawings. The components in the drawings are not necessarily to scale. Instead, emphasis is placed on illustrating clearly the principles of the present technology. For ease of reference, throughout this disclosure identical reference numbers may be used to identify identical or at least generally similar or analogous components or features.

In FIG. 15, the portion of the distal jacket is shown without a band electrode. In FIG. 16, the portion of the distal jacket is shown resiliently deformed inwardly as a band electrode is moved toward the reduced-diameter segment. In FIG. 17, the portion of the distal jacket is shown with the band electrode seated in the reduced-diameter segment.

DETAILED DESCRIPTION

Specific details of systems, devices, and methods in accordance with several embodiments of the present technology are disclosed herein with reference to FIGS. 1-21. Although the systems, devices, and methods may be disclosed herein primarily or entirely with respect to intravascular renal neuromodulation, other applications in addition to those disclosed herein are within the scope of the present technology. For example, systems, devices, and methods in accordance with at least some embodiments of the present technology may be useful for neuromodulation within a body lumen other than a vessel, for extravascular neuromodulation, for non-renal neuromodulation, and/or for use in therapies other than neuromodulation. Furthermore, it should be understood, in general, that other systems, devices, and methods in addition to those disclosed herein are within the scope of the present technology. For example, systems, devices, and methods in accordance with embodiments of the present technology can have different and/or additional configurations, components, and procedures than those disclosed herein. Moreover, a person of ordinary skill in the art will understand that systems, devices, and methods in accordance with embodiments of the present technology can be without one or more of the configurations, components, and/or procedures disclosed herein without deviating from the present technology.

As used herein, the terms "distal" and "proximal" define a position or direction with respect to a clinician or a clinician's control device (e.g., a handle of a catheter). The terms, "distal" and "distally" refer to a position distant from or in a direction away from a clinician or a clinician's control device. The terms "proximal" and "proximally" refer to a position near or in a direction toward a clinician or a clinician's control device. The headings provided herein are for convenience only and should not be construed as limiting the subject matter disclosed.

Selected Examples of Neuromodulation Catheters
and Related Systems and Devices

Figure 1:
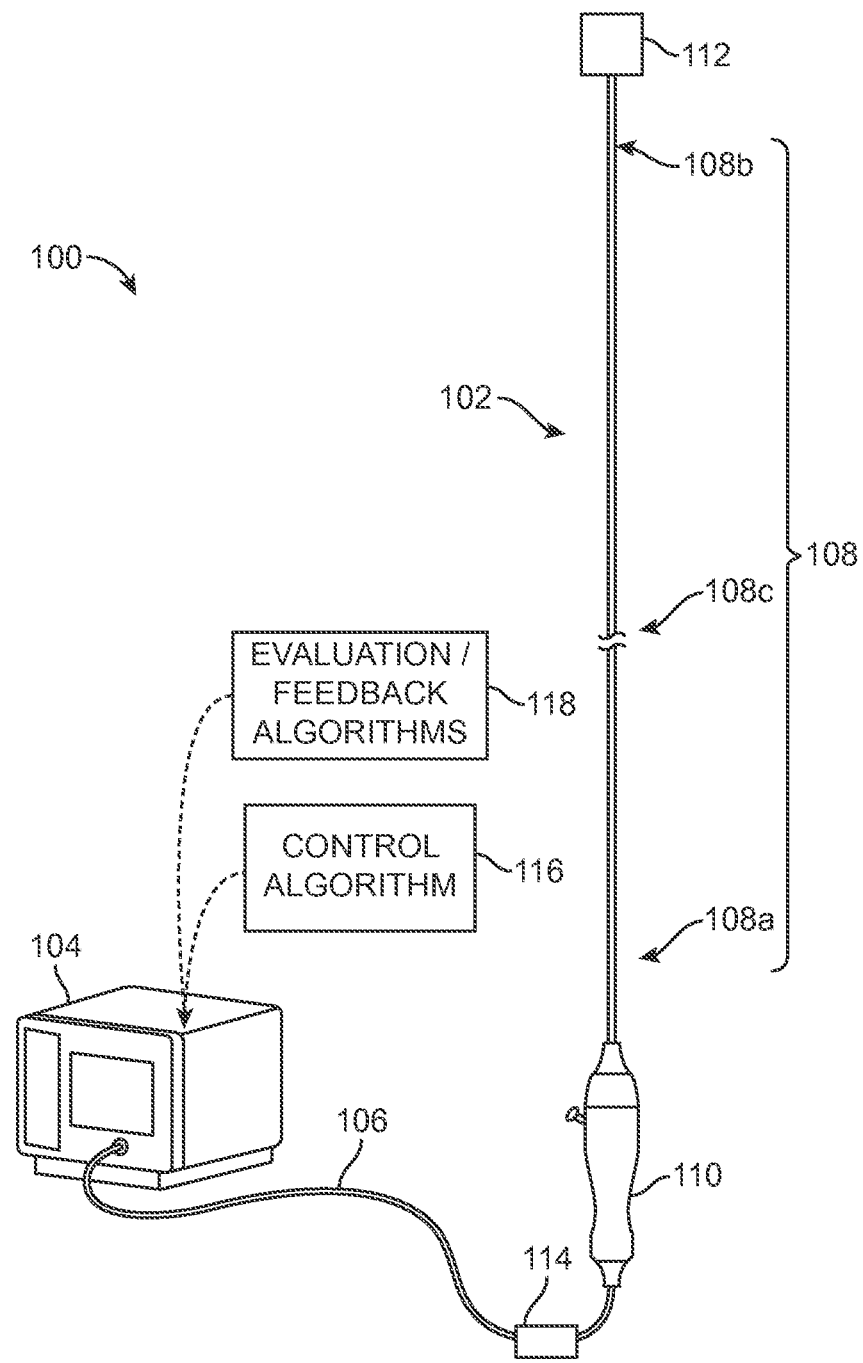
FIG. 1 is a partially schematic perspective view illustrating a therapeutic system configured in accordance with an embodiment of the present technology. The system is shown in FIG. 1 including a neuromodulation catheter having a shaft.

FIG. 1 is a partially schematic perspective view illustrating a therapeutic system 100 configured in accordance with an embodiment of the present technology. The system 100 can include a neuromodulation catheter 102, a console 104, and a cable 106 extending between the catheter 102 and the console 104. The catheter 102 can include an elongate shaft 108 having a proximal end portion 108a, a distal end portion 108b, and an intermediate portion 108c therebetween. The catheter 102 can further include a handle 110 operably connected to the shaft 108 via the proximal end portion 108a of the shaft 108 and a neuromodulation element 112 (shown schematically in FIG. 1) operably connected to the shaft 108 via the distal end portion 108b of the shaft 108. The shaft 108 can be configured to locate the neuromodulation element 112 at a treatment location within or otherwise proximate to a body lumen (e.g., a blood vessel, a duct, an airway, or another naturally occurring lumen within the human body). In some embodiments, the shaft 108 can be configured to locate the neuromodulation element 112 at an intraluminal (e.g., intravascular) location. The neuromodulation element 112 can be configured to provide or support a neuromodulation treatment at the treatment location. The shaft 108 and the neuromodulation element 112 can be 2, 3, 4, 5, 6, or 7 French or other suitable sizes.

Intraluminal delivery of the catheter 102 can include percutaneously inserting a guide wire (not shown) into a body lumen of a patient and moving the shaft 108 and the neuromodulation element 112 along the guide wire until the neuromodulation element 112 reaches a suitable treatment location. Alternatively, the catheter 102 can be a steerable or non-steerable device configured for use without a guide wire. As another alternative, the neuromodulation catheter 102 can be configured for use with a guide catheter or sheath (not shown). In the illustrated embodiment, the console 104 is configured to control, monitor, supply, and/or otherwise support operation of the catheter 102. In other embodiments, the catheter 102 can be self-contained or otherwise configured for operation independent of the console 104. When present, the console 104 can be configured to generate a selected form and/or magnitude of energy for delivery to tissue at a treatment location via the neuromodulation element 112. For example, the console 104 can be configured to generate radio frequency (RF) energy (e.g., monopolar and/or bipolar RF energy) and/or another suitable type of energy for delivery to tissue at a treatment location via electrodes (not shown) of the neuromodulation element 112. Along the cable 106 or at another suitable location within the system 100, the system 100 can include a control device 114 configured to initiate, terminate, and/or adjust operation of one or more components of the catheter 102 directly and/or via the console 104. The console 104 can be configured to execute an automated control algorithm 116 and/or to receive control instructions from an operator. Similarly, the console 104 can be configured to provide feedback to an operator before, during, and/or after a treatment procedure via an evaluation/feedback algorithm 118.

Figure 2:
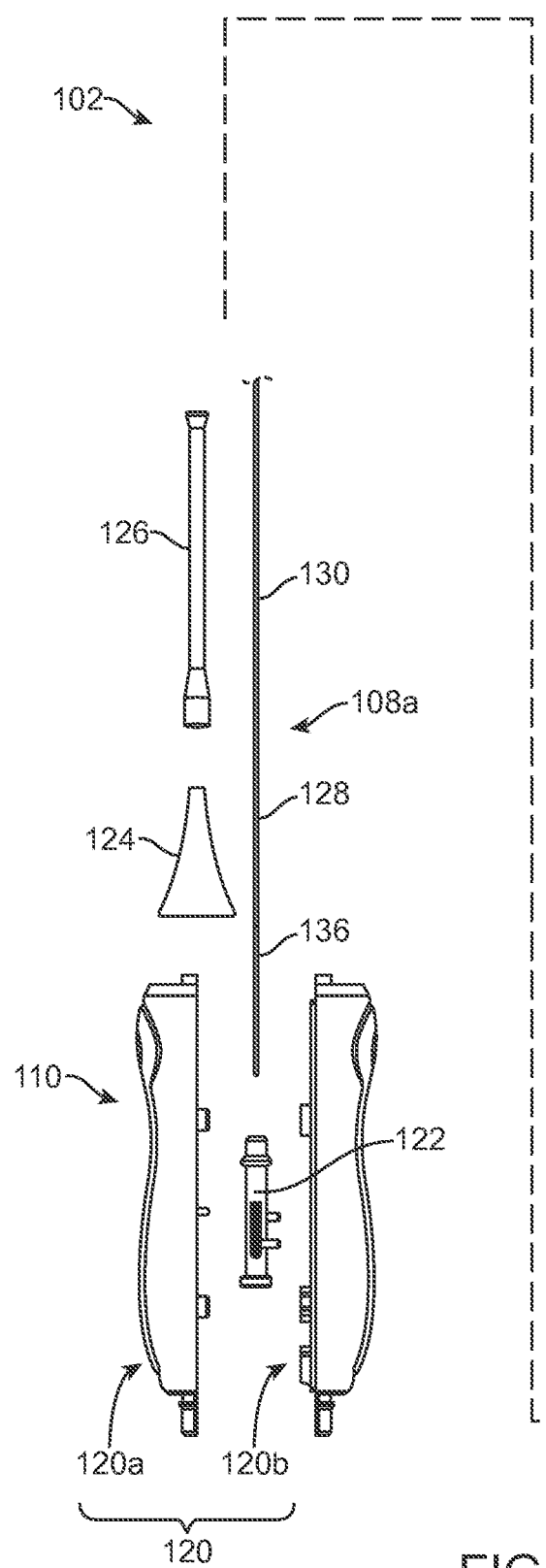
FIG. 2 is an exploded profile view of the catheter shown in FIG. 1.
Figure 2:
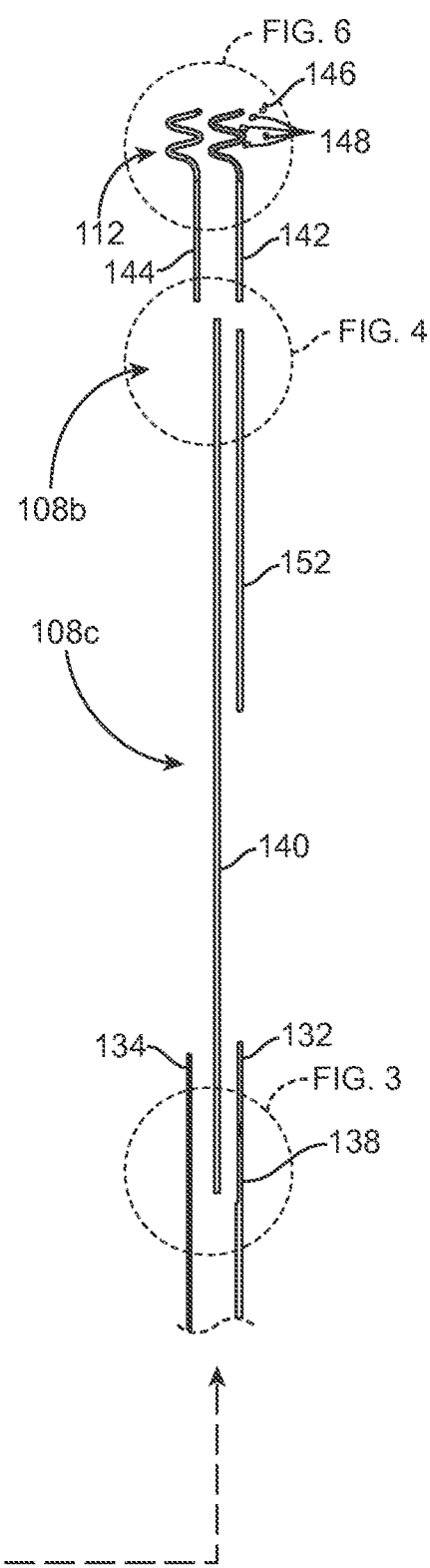
Figure 3:
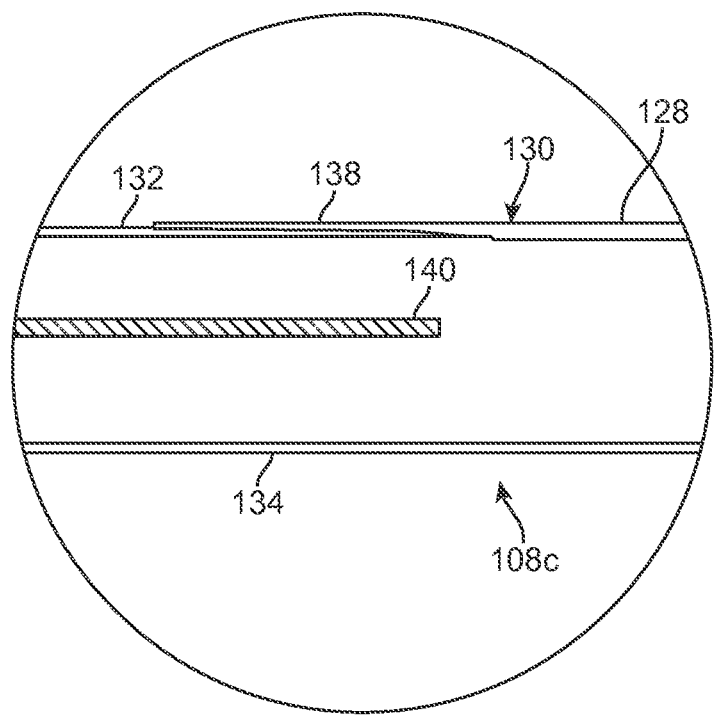
FIGS. 3, 4 and 6 are enlarged exploded profile views of portions of the catheter shown in FIG. 1 taken at respective locations designated in FIG. 2.
Figure 4:
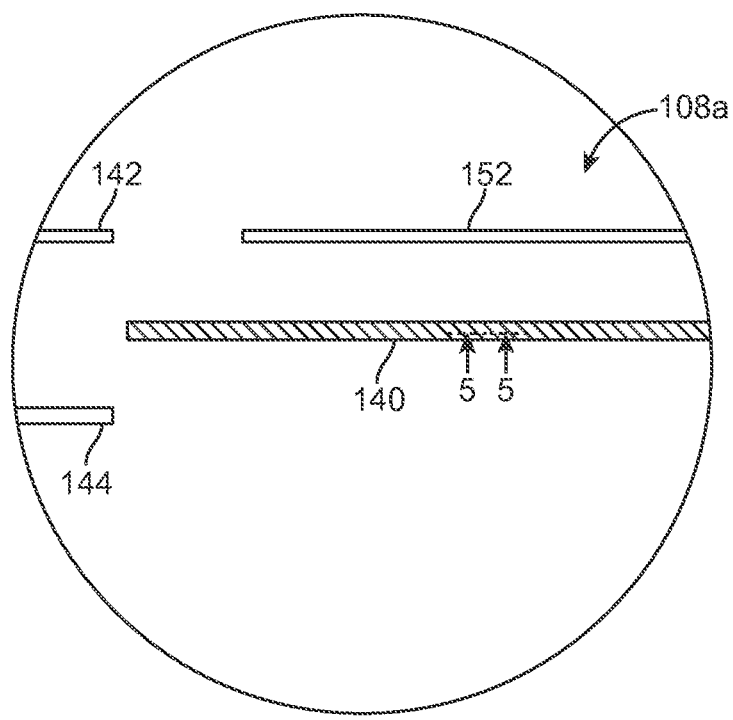
Figure 6:
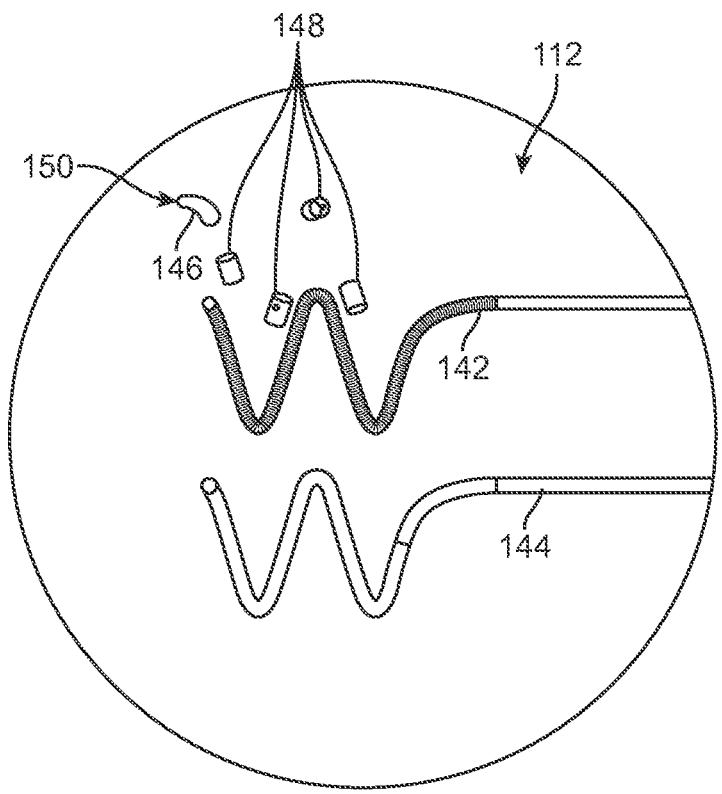

FIG. 2 is an exploded profile view of the catheter 102. FIGS. 3, 4 and 6 are enlarged exploded profile views of portions of the catheter 102 taken at respective locations designated in FIG. 2. With reference to FIGS. 2-4 and 6 together, the handle 110 can include mating shell segments 120 (individually identified as shell segments 120a, 120b) and a connector 122 (e.g., a luer connector) operably positioned between the mating shell segments 120. The handle 110 can further include a distally tapered strain-relief element 124 operably connected to distal ends of the shell segments 120. Slidably positioned over the shaft 108, the catheter 102 can include a loading tool 126 configured to facilitate loading the catheter 102 onto a guide wire (not shown). When assembled, the shaft 108 can extend through coaxial lumens (also not shown) of the strain-relief element 124 and the loading tool 126, respectively, and between the shell segments 120 to the connector 122.

The shaft 108 can include an assembly of parallel tubular segments. At its proximal end portion 108a and extending distally though a majority of its intermediate portion 108c, the shaft 108 can include a proximal hypotube segment 128, a proximal jacket 130, a first electrically insulative tube 132, and a guide-wire tube 134. The first electrically insulative tube 132 and the guide-wire tube 134 can be disposed side-by-side within the proximal hypotube segment 128. The first electrically insulative tube 132 can be configured to carry electrical leads (not shown) and to electrically insulate the electrical leads from the proximal hypotube segment 128. The guide-wire tube 134 can be configured to carry a guide wire (not shown). The proximal jacket 130 can be disposed around at least a portion of an outer surface of the proximal hypotube segment 128. The proximal hypotube segment 128 can include a proximal stem 136 at its proximal end and a distal skive 138 at its distal end. The proximal jacket 130 and the proximal hypotube segment 128 are discussed in greater detail below with reference to FIGS. 7-9.

With reference again to FIGS. 2-4 and 6, the first electrically insulative tube 132 and the guide-wire tube 134 can extend distally beyond the distal skive 138. The shaft 108 can include an intermediate tube 140 beginning proximally at a region of the shaft 108 at which the first electrically insulative tube 132 and the guide-wire tube 134 distally emerge from the proximal hypotube segment 128. The intermediate tube 140 can be more flexible than the proximal hypotube segment 128. At the region of the shaft 108 at which the first electrically insulative tube 132 and the guide-wire tube 134 distally emerge from the proximal hypotube segment 128, the intermediate tube 140 can be coaxially aligned with the proximal hypotube segment 128 so as to receive the first electrically insulative tube 132 and the guide-wire tube 134. From this region, the intermediate tube 140 can extend distally to the distal end portion 108b of the shaft 108. The first electrically insulative tube 132 can distally terminate within the intermediate tube 140. In contrast, the guide-wire tube 134 can extend through the entire length of the intermediate tube 140. At a distal end of the intermediate tube 140, the shaft 108 can be operably connected to the neuromodulation element 112.

Figure 5:
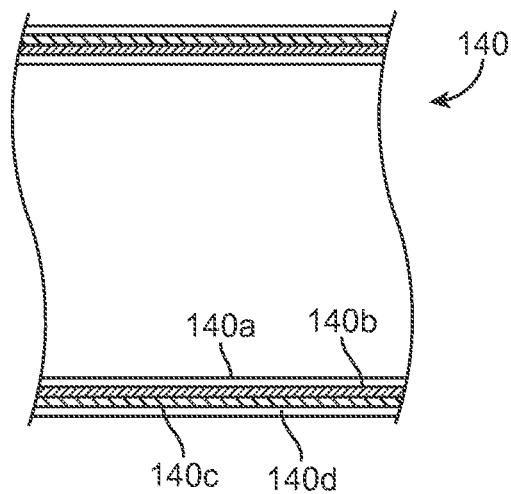
FIG. 5 is a further enlarged cross-sectional view of an intermediate tube of the shaft shown in FIG. 1 taken along a line 5-5 designated in FIG. 4.

FIG. 5 is a further enlarged cross-sectional view of the intermediate tube 140 taken along a line 5-5 designated in FIG. 4. Arranged from innermost to outermost, the intermediate tube 140 can include an inner polymer layer 140a, a metal braid 140b, a first outer polymer layer 140c, and a second outer polymer layer 140d. In a particular embodiment, the inner polymer layer 140a is made of polyimide (e.g., about 0.006 inch thick); the metal braid 140b is made of stainless steel; the first outer polymer layer 140c is made of coated polyimide (e.g., three coats); and the second outer polymer layer 140d is made of polyether block amide (e.g., PEBAX®) (e.g., about 0.00125 inch thick). Other suitable compositions and arrangements are also possible. In some embodiments, at least a portion of the intermediate tube 140 is film-cast. For example, disposing the first outer polymer layer 140c onto the metal braid 140b as a series of thin films can allow the thickness of the first outer polymer layer 140c to be precisely controlled. Accordingly, the first outer polymer layer 140c can be just thick enough to prevent the ends of the metal braid 140b from becoming exposed or otherwise damaged when thermally bonding the intermediate tube 140 to the proximal and distal hypotube segments 128, 142, respectively, but not so thick as to cause the intermediate tube 140 to become excessively stiff. This can reduce or eliminate the need to locally reinforce the ends of the intermediate tube 140 or to splice coupling components onto the ends of the intermediate tube 140 to facilitate bonding the intermediate tube 140 to the proximal and distal hypotube segments 128, 142.

The neuromodulation element 112 can include a distal hypotube segment 142 coupled to the distal end of the intermediate tube 140. The neuromodulation element 112 can also include a distal jacket 144 disposed around at least a portion of an outer surface of the distal hypotube segment 142. As shown, the neuromodulation element 112 can further include band electrodes 146 disposed outside the distal jacket 144 at spaced-apart positions along a longitudinal axis of the distal jacket 144. At a distal end of the distal hypotube segment 142, the neuromodulation element 112 can include a distally tapering atraumatic tip 148. The guide-wire tube 134 can extend through the distal hypotube segment 142 to a distal opening 150 of the tip 148. The electrical leads can respectively extend through the distal hypotube segment 142 to the band electrodes 146.

In FIGS. 2 and 6, the neuromodulation element 112 is shown in a radially expanded deployed state. The neuromodulation element 112 can be movable from a low-profile delivery state to the radially expanded deployed state. When the neuromodulation element 112 is in the radially expanded deployed state, the distal hypotube segment 142 can have a shape that is more helical (spiral) than its shape when the neuromodulation element 112 is in the low-profile delivery state. In at least some cases, the distal hypotube segment 142 has the more helical shape when at rest and is configured to be forced into the less helical shape by an external sheath (not shown). The distal hypotube segment 142 can be made at least partially of nitinol, stainless steel, or another suitable material well suited for resiliently moving between the more helical and less helical shapes. In at least some cases, the material of the distal hypotube segment 142 is electrically conductive. Accordingly, the neuromodulation element 112 can include a second electrically insulative tube 152 disposed around an outer surface of the distal hypotube segment 142 so as to electrically separate the band electrodes 146 from the distal hypotube segment 142. In some embodiments, the first and second electrically insulative tubes 132, 152 are made at least partially (e.g., predominantly or entirely) of polyimide and polyether block amide, respectively. In other embodiments, the first and second electrically insulative tubes 132, 152 can be made of other suitable materials.

Figure 7:
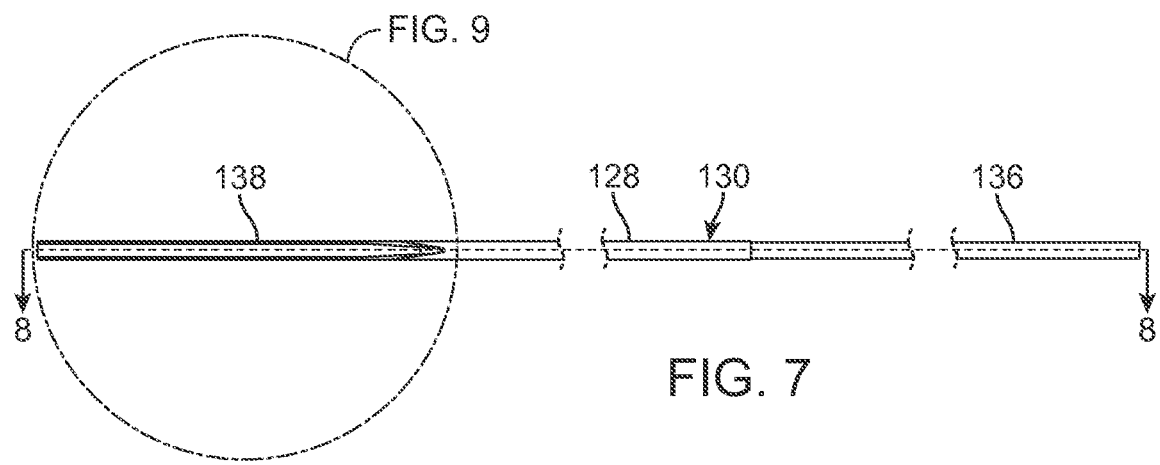
FIG. 7 is a profile view of a proximal hypotube segment and a proximal jacket of the shaft shown in FIG. 1.
Figure 8:
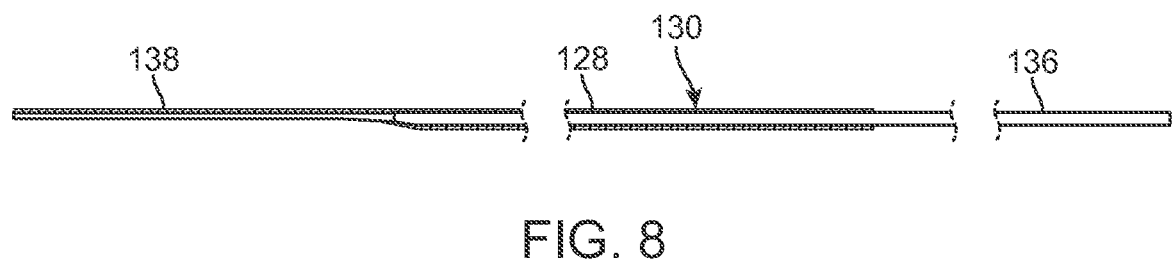
FIG. 8 is a cross-sectional profile view of the proximal hypotube segment and the proximal jacket shown in FIG. 7 taken along a line 8-8 designated in FIG. 7.
Figure 9:
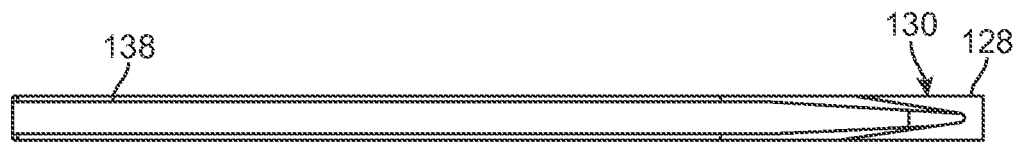
FIG. 9 is an enlarged profile view of a portion of the proximal hypotube segment and the proximal jacket shown in FIG. 7 taken at a location designated in FIG. 7.

FIG. 7 is a profile view of the proximal hypotube segment 128 and the proximal jacket 130. FIG. 8 is a cross-sectional profile view of the proximal hypotube segment 128 and the proximal jacket 130 taken along a line 8-8 designated in FIG. 7. FIG. 9 is an enlarged profile view of a portion of the proximal hypotube segment 128 and the proximal jacket 130 taken at a location designated in FIG. 7. As shown in FIGS. 7 and 8, the proximal jacket 130 can be absent from the outer surface of the proximal hypotube segment 128 at the proximal stem 136. This can be useful, for example, to facilitate connecting the proximal hypotube segment 128 to the connector 122. In contrast, the proximal jacket 130 can be disposed on at least a portion of the outer surface of the proximal hypotube segment 128 at the distal skive 138. In some embodiments, the proximal hypotube segment 128 is made at least partially (e.g., predominantly or entirely) of nitinol. In these and other embodiments, the proximal jacket 130 can be made at least partially (e.g., predominantly or entirely) of a polymer blend including polyether block amide and polysiloxane. For example, the polymer blend can include greater than 15% polysiloxane. In a particular embodiment, the polymer blend includes about 20% by weight polyether block amide and about 80% by weight polyether block amide. This material may allow the proximal jacket 130 to have sufficient lubricity for use without an outer coating, among other potential advantages. In still other embodiments, the proximal hypotube segment 128 and the proximal jacket 130 can be made of other suitable materials.

Figure 10:
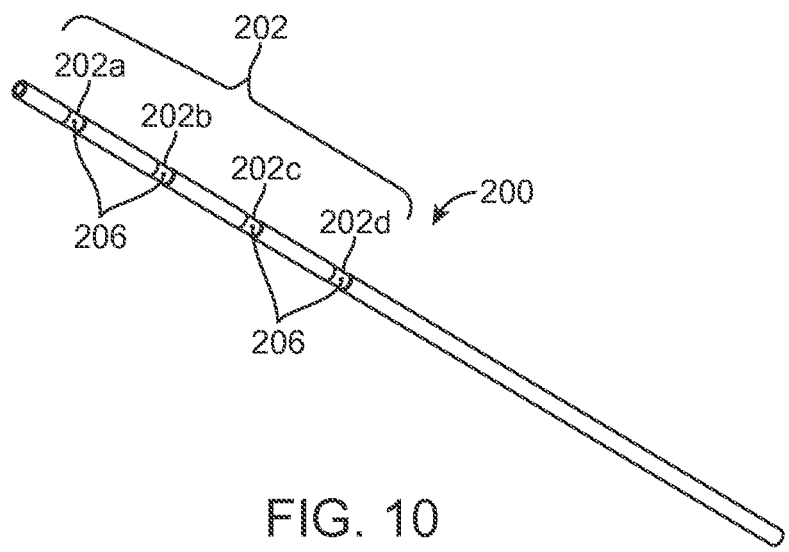
FIG. 10 is a perspective view of a distal jacket of a neuromodulation element of a neuromodulation catheter configured in accordance with an embodiment of the present technology. The distal jacket is shown in FIG. 10 including reduced-diameter segments.
Figure 11:
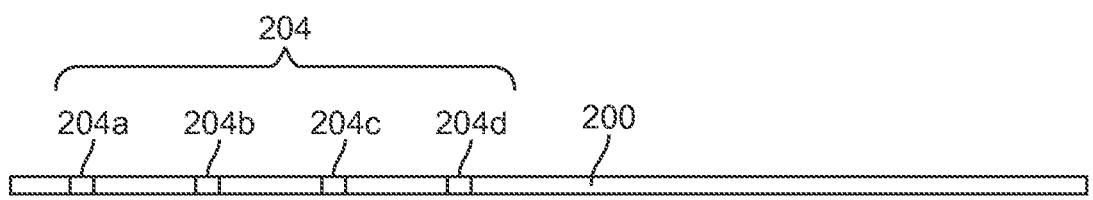
FIG. 11 is a profile view of the distal jacket shown in FIG. 10 and band electrodes respectively seated in the reduced-diameter segments.
Figure 12:
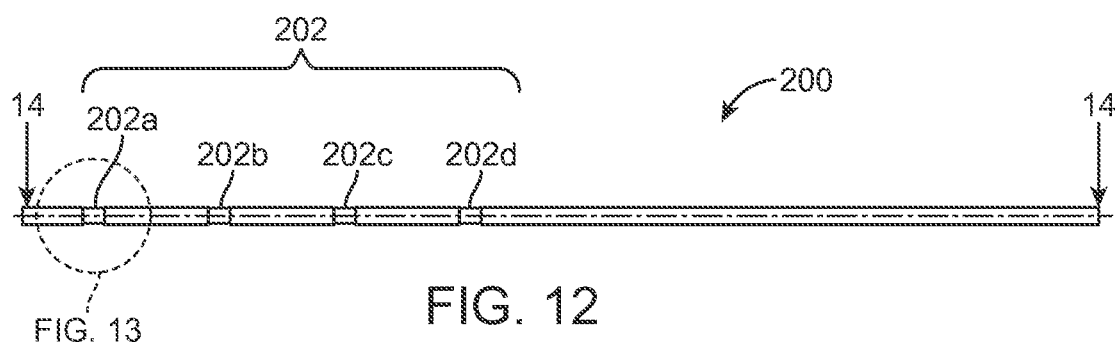
FIG. 12 is a profile view of the distal jacket shown in FIG. 10.
Figure 13:
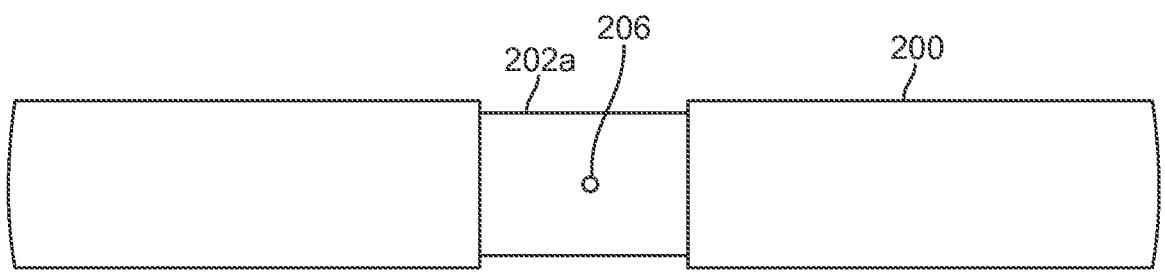
FIG. 13 is an enlarged profile view of a portion of the distal jacket shown in FIG. 9 taken at a location designated in FIG. 12.
Figure 14:
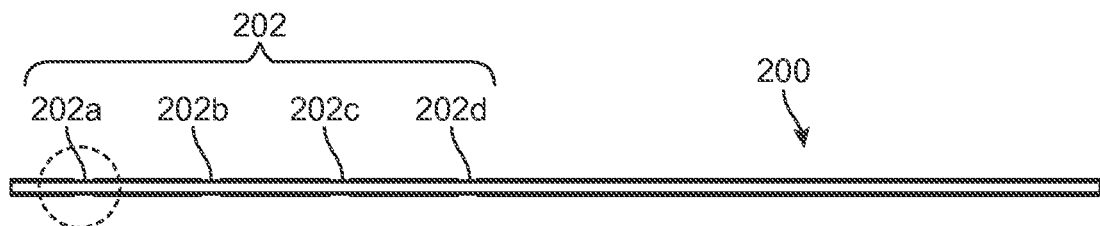
FIG. 14 is a cross-sectional profile view of the distal jacket shown in FIG. 10 taken along a line 14-14 designated in FIG. 12.

FIG. 10 is a perspective view of a distal jacket 200 of a neuromodulation element of a neuromodulation catheter configured in accordance with an embodiment of the present technology. The distal jacket 200, for example, can be used in the neuromodulation element 112 (FIGS. 1, 2 and 6) in place of the distal jacket 144 (FIGS. 2 and 6). Accordingly, the distal jacket 200 may be described below in conjunction with components of the catheter 102 (FIGS. 1 and 2). The distal jacket 200 can include reduced-diameter segments 202 (individually identified as reduced-diameter segments 202a-202d) extending through its outer surface. FIG. 11 is a profile view of the distal jacket 200 and band electrodes 204 (individually identified as band electrodes 204a-204d) respectively seated in the reduced-diameter segments 202. FIG. 12 is a profile view of the distal jacket 200 without the band electrodes 204. FIG. 13 is an enlarged profile view of a portion of the distal jacket 200 taken at a location designated in FIG. 12. FIG. 14 is a cross-sectional profile view of the distal jacket 200 taken along a line 14-14 designated in FIG. 12.

With reference to FIGS. 10-14 together, the distal jacket 200 can be tubular and configured to be disposed around at least a portion of an outer surface of the distal hypotube segment 142 (FIGS. 2 and 6). The reduced-diameter segments 202 can be insets, pockets, grooves, or other suitable features configured to respectively seat the band electrodes 204. In the illustrated embodiment, the distal jacket 200 includes exactly four reduced-diameter segments 202 spaced apart along its longitudinal axis. Alternatively, the distal jacket 200 can include exactly one, two, three, five, six or a greater number of reduced-diameter segments 202. The reduced-diameter segments 202 may be spaced apart at equal distances or at different distances. The distal jacket 200 can include openings 206 respectively positioned at the reduced-diameter segments 202. A neuromodulation catheter including the distal jacket 200 can include electrical leads (not shown) extending from respective reduced-diameter segments 202, through respective openings 206, through a lumen of the distal hypotube segment 142 (FIGS. 2 and 6), through the intermediate tube 140, and through the proximal hypotube segment 128 to the handle 110. In this way, the electrical leads can respectfully connect the band electrodes 204 to proximal components of a neuromodulation catheter including the distal jacket 200.

Figure 15:
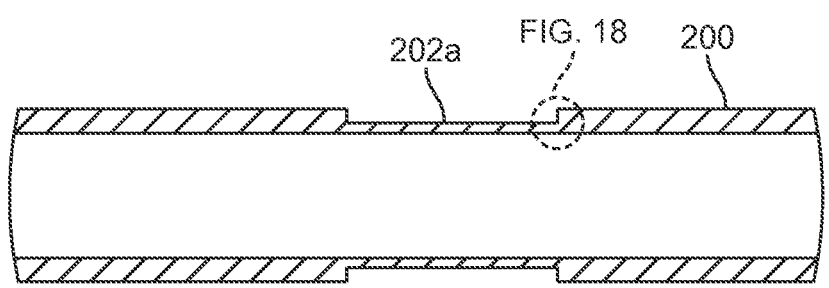
FIGS. 15-17 are enlarged cross-sectional profile views of a portion of the distal jacket shown in FIG. 10 at a location designated in FIG. 14. The portion of the distal jacket shown in FIGS. 15-17 includes one of the reduced-diameter segments shown in FIG. 10.
Figure 16:
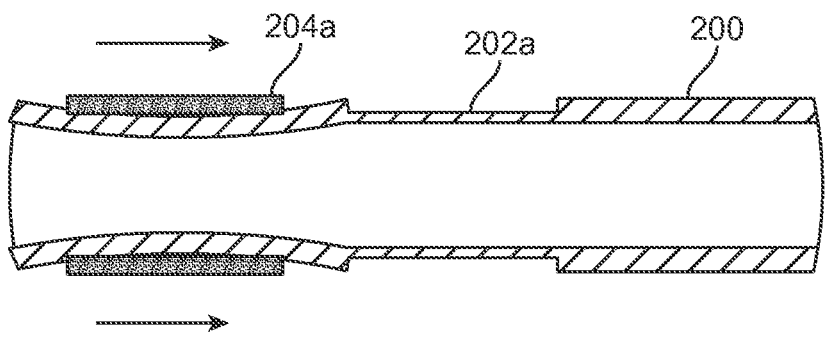
Figure 17:
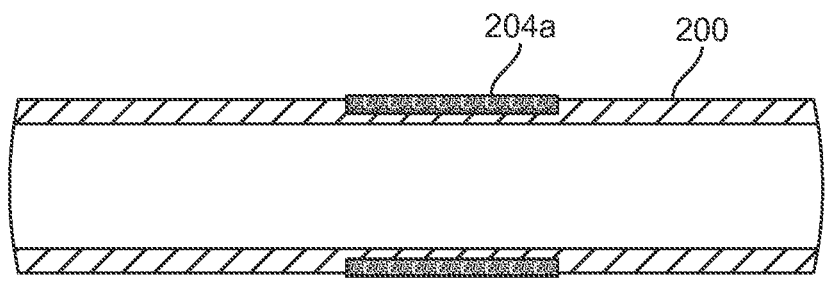

FIGS. 15-17 are enlarged cross-sectional profile views of a portion of the distal jacket 200 at a location designated in FIG. 14. At this location, the distal jacket 200 can include the reduced-diameter segment 202a. In FIG. 15, the portion of the distal jacket 200 is shown without the band electrode 204a corresponding to the reduced-diameter segment 202a. In FIG. 16, the portion of the distal jacket 200 is shown resiliently deformed inwardly as the band electrode 204a is moved toward the reduced-diameter segment 202a. In FIG. 17, the portion of the distal jacket 200 is shown with the band electrode 204a seated in the reduced-diameter segment 202a. With reference to FIGS. 10-17 together, the band electrodes 204 can respectively form closed loops extending circumferentially around the distal jacket 200. In at least some cases, a minimum inner diameter of the band electrodes 204 is smaller than a maximum outer diameter of distal jacket 200 between the reduced-diameter segments 202. To facilitate assembly, the distal jacket 200 between the reduced-diameter segments 202 can be resilient in response to peristaltic deflection of a magnitude corresponding to a difference between the maximum outer diameter of the distal jacket 200 between the reduced-diameter segments 202 and the minimum inner diameter of the band electrodes 204. Suitable materials for the distal jacket 200 include polymer blends including polyurethane and polysiloxane, among others.

A maximum outer diameter of the band electrodes 204 and the maximum outer diameter of the distal jacket 200 between the reduced-diameter segments 202 can be at least generally equal (e.g., within 5%, 3%, or 2% of one another). Thus, once the band electrodes 204 are respectively seated in the reduced-diameter segments 202, outer surfaces of the band electrodes 204 and the distal jacket 200 between the reduced-diameter segments 202 can be at least generally flush. This can be useful, for example, to reduce or eliminate potentially problematic ridges (e.g., circumferential steps) at distal and proximal ends of the individual band electrodes 204. This, in turn, can reduce or eliminate the need for fillets (e.g., adhesive fillets, such as glue fillets) at the distal and proximal ends of the individual band electrodes 204. In at least some embodiments, the distal jacket 200 and the band electrodes 204 can be bonded to one another without any exposed adhesive. For example, an adhesive (not shown) can be disposed between the band electrodes 204 and the distal jacket 200 at the reduced-diameter segments 202.

Figure 18:
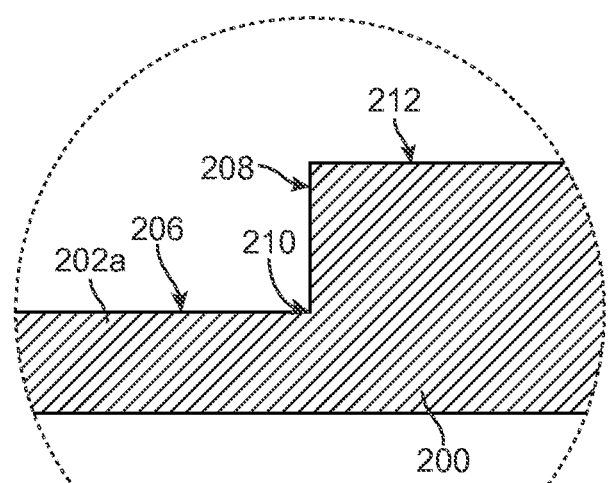
FIG. 18 is an enlarged cross-sectional profile view of a sidewall of one of the reduced-diameter segments shown in FIG. 10 at a location designated in FIG. 15.

FIG. 18 is an enlarged cross-sectional profile view of a sidewall of the reduced-diameter segment 202a at a location designated in FIG. 15. As shown in FIG. 18, the reduced-diameter segment 202a can include a floor 206, a sidewall 208, and a corner 210 therebetween. The distal jacket 200 can further include a rim 212 bordering the reduced-diameter segment 202a. In the illustrated embodiment, the sidewall 208 is vertical and perpendicular to the floor 206 and the rim 212. In particular, the sidewall 208 meets the floor 206 and the rim 212 at a 90° angle and a 270° angle, respectively. This configuration of the sidewall 208 can facilitate secure seating of a band electrode (not shown in FIG. 18) in the reduced-diameter segment 202a without a gap being formed between the band electrode and an upper portion of the sidewall 208. Such a gap can be problematic, for example, because it can present an edge that may interfere with smooth movement of the distal jacket 200 through a patient's vasculature. Disadvantageously, tensile loading on the distal jacket 200 may tend to concentrate at the corner 210. This can adversely affect the durability of the distal jacket 200.

Figure 19:
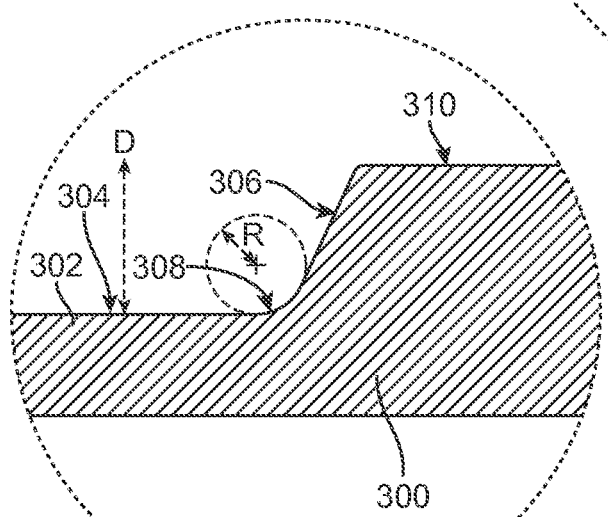
FIGS. 19 and 20 are enlarged cross-sectional profile views of sidewalls of reduced-diameter segments having configurations different than the configuration of the sidewall shown in FIG. 18.
Figure 20:
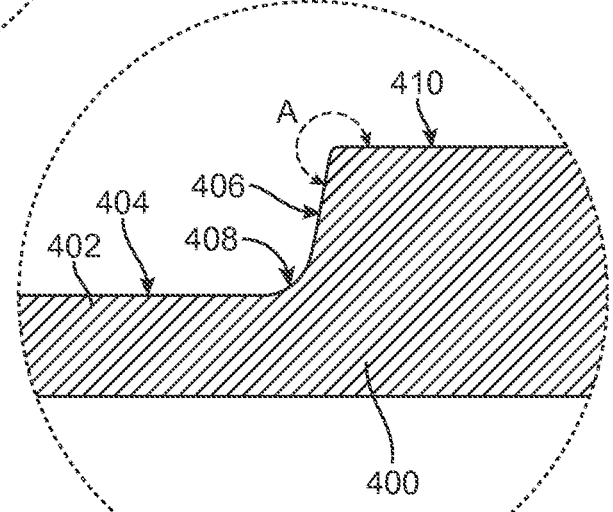

Sidewall configurations different than the configuration shown in FIG. 18 may be advantageous in at least some cases. FIGS. 19 and 20 illustrate two examples of such alternative configurations. FIG. 19, in particular, is an enlarged cross-sectional profile view of a portion of a distal jacket 300 including a reduced-diameter segment 302 having a floor 304, a sidewall 306, and a rounded junction 308 therebetween. The distal jacket 300 can further include a rim 310 bordering the reduced-diameter segment 302. In the illustrated embodiment, the sidewall 306 is slanted relative to the floor 304 and the rim 310. The reduced-diameter segment 302 can have a depth (D) between the floor 304 and the rim 310. The rounded junction 308 can have a radius (R) within a range from 25% to 50% of the depth. In at least some embodiments, the radius is within a range from 0.5 mil to 3 mils (e.g., a range from 1 mil to 2 mils). The shape of the rounded junction 308 can promote diffusion of tensile loading on the distal jacket 300, thereby enhancing the durability of the distal jacket 300. Furthermore, the sidewall 306 and the rounded junction 308 can be entirely on one side of a plane along which a portion of the floor 304 directly adjacent to the rounded junction 308 lies. Because the sidewall 306 and the rounded junction 308 do not extend through this plane, the material thickness of the distal jacket 300 at the rounded junction 308 can be no less than the material thickness of the distal jacket 300 elsewhere along the reduced-diameter segment 302. Correspondingly, the tensile strength of the distal jacket 300 at the rounded junction 308 can be no less than the material thickness of the distal jacket 300 elsewhere along the reduced-diameter segment 302.

FIG. 20 is an enlarged cross-sectional profile view of a portion of a distal jacket 400 including a reduced-diameter segment 402 having a floor 404, a sidewall 406, and a rounded junction 408 therebetween. The distal jacket 400 can further include a rim 410 bordering the reduced-diameter segment 402. In the illustrated embodiment, the sidewall 406 is more vertical relative to the floor 404 and the rim 410 than the sidewall 306 of the reduced-diameter segment 302 shown in FIG. 19. In at least some embodiments, the sidewall 406 from the rounded junction 408 to the rim 410 has an average angle (A) greater than 240° (e.g., greater than 260°) relative to the rim 410. As discussed above with reference to FIG. 18, vertical or near-vertical orientation of the sidewall 406 can facilitate secure seating of a band electrode (not shown in FIG. 20) in the reduced-diameter segment 402 without a gap or with only a minor gap being formed between the band electrode and an upper portion of the sidewall 406.

Selected Examples of Manufacturing Methods for Neuromodulation Elements

Figure 21:
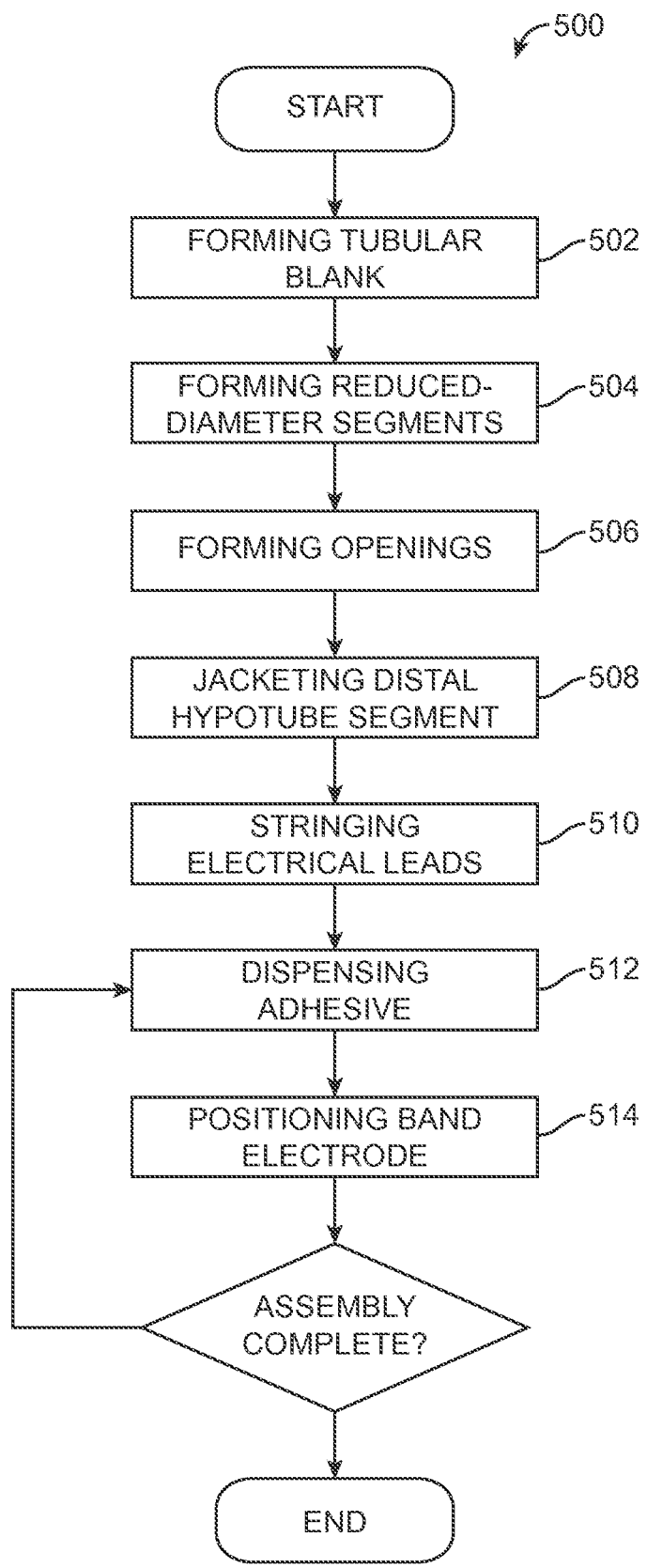
FIG. 21 is a flow chart illustrating a method for making a neuromodulation element including the distal jacket shown in FIG. 10 and the band electrodes shown in FIG. 11 in accordance with an embodiment of the present technology.

FIG. 21 is a flow chart illustrating a method 500 for making a neuromodulation element including the distal jacket 200 and the band electrodes 204 in accordance with an embodiment of the present technology. With reference to FIGS. 10-21 together, the method 500 can begin with forming the distal jacket 200. This can include forming a tubular blank (block 502) (e.g., by extrusion) and then using a subtractive process (e.g., by laser ablation) to remove portions of the blank and thereby form the reduced-diameter segments 202 (block 504). The same or a different subtractive process can be used to form the openings 206 (block 506). Alternatively, the distal jacket 200 can be formed by injection molding or another suitable technique that allows the reduced-diameter segments 202 and/or the openings 206 to be formed without the need for a subtractive process. When a subtractive process is used to form the reduced-diameter segments 202, the subtractive process can be precisely controlled so as to leave an innermost portion of a wall of the distal jacket 200 intact at the reduced-diameter segments 202. Laser ablation is one example of a suitable subtractive process for forming the reduced-diameter segments 202. Laser ablation can include loading the blank onto a mandrel and then rotating the blank and the mandrel relative to an ablative laser (or rotating the ablative laser relative to the black and the mandrel) under computerized control. The mandrel can conductively cool the innermost portion of the wall of the distal jacket 200 so as to prevent this portion of the wall from reaching ablative temperatures at the reduced-diameter segments 202. Furthermore, laser ablation and other subtractive processes can be carefully controlled to avoid forming a notch or other indentation in the distal jacket 200 below the floor 206 at the corner 210. When present, such an indentation may unduly decrease the tensile strength of the distal jacket 200. Other techniques for forming the reduced-diameter segments 202 are also possible.

The method 500 can further include jacketing the distal hypotube segment 142 (block 508), such as by positioning the distal jacket 200 and the distal hypotube segment 142 relative to one another so that the distal jacket 200 is disposed around at least a portion of an outer surface of the distal hypotube segment 142. In at least some embodiments, the form and/or other aspects of the distal jacket 200 may allow the distal jacket 200 to be disposed around at least a portion of the outer surface of the distal hypotube segment 142 without swaging the distal jacket 200. When the distal hypotube segment 142 is positioned within the distal jacket 200, the method 500 can include respectively stringing electrical leads (block 510) from the reduced-diameter segments 202 through a lumen of the distal hypotube segment 142. Next, the method 500 can include dispensing an adhesive (block 512) onto the distal jacket 200 at the reduced-diameter segment 202d. Then, the method 500 can include positioning the band electrode 204d (block 514) at the reduced-diameter segment 202d. As discussed above with reference to FIGS. 15-17, positioning the band electrode 204d can include resiliently deforming the distal jacket 200 inwardly while passing (e.g., advancing or threading) the distal jacket 200 through a channel of the band electrode 204d so as to move the band electrode 204d toward a longitudinal position at which the band electrode 204d is aligned with the reduced-diameter segment 202d. The same process can be used to install the band electrodes 204c, the band electrode 204b, and finally the band electrode 204a.

Renal Neuromodulation

Catheters configured in accordance with at least some embodiments of the present technology can be well suited (e.g., with respect to sizing, flexibility, operational characteristics, and/or other attributes) for performing renal neuromodulation in human patients. Renal neuromodulation is the partial or complete incapacitation or other effective disruption of nerves of the kidneys (e.g., nerves terminating in the kidneys or in structures closely associated with the kidneys). In particular, renal neuromodulation can include inhibiting, reducing, and/or blocking neural communication along neural fibers (e.g., efferent and/or afferent neural fibers) of the kidneys. Such incapacitation can be long-term (e.g., permanent or for periods of months, years, or decades) or short-term (e.g., for periods of minutes, hours, days, or weeks). Renal neuromodulation is expected to contribute to the systemic reduction of sympathetic tone or drive and/or to benefit at least some specific organs and/or other bodily structures innervated by sympathetic nerves. Accordingly, renal neuromodulation is expected to be useful in treating clinical conditions associated with systemic sympathetic overactivity or hyperactivity, particularly conditions associated with central sympathetic overstimulation. For example, renal neuromodulation is expected to efficaciously treat hypertension, heart failure, acute myocardial infarction, metabolic syndrome, insulin resistance, diabetes, left ventricular hypertrophy, chronic and end stage renal disease, inappropriate fluid retention in heart failure, cardio-renal syndrome, polycystic kidney disease, polycystic ovary syndrome, osteoporosis, erectile dysfunction, and sudden death, among other conditions.

Renal neuromodulation can be electrically-induced, thermally-induced, or induced in another suitable manner or combination of manners at one or more suitable treatment locations during a treatment procedure. The treatment location can be within or otherwise proximate to a renal lumen (e.g., a renal artery, a ureter, a renal pelvis, a major renal calyx, a minor renal calyx, or another suitable structure), and the treated tissue can include tissue at least proximate to a wall of the renal lumen. For example, with regard to a renal artery, a treatment procedure can include modulating nerves in the renal plexus, which lay intimately within or adjacent to the adventitia of the renal artery. Various suitable modifications can be made to the catheters described above to accommodate different treatment modalities. For example, the band electrodes 204 (FIG. 11) can be replaced with transducers to facilitate transducer-based treatment modalities.

Renal neuromodulation can include an electrode-based or treatment modality alone or in combination with another treatment modality. Electrode-based or transducer-based treatment can include delivering electricity and/or another form of energy to tissue at or near a treatment location to stimulate and/or heat the tissue in a manner that modulates neural function. For example, sufficiently stimulating and/or heating at least a portion of a sympathetic renal nerve can slow or potentially block conduction of neural signals to produce a prolonged or permanent reduction in renal sympathetic activity. A variety of suitable types of energy can be used to stimulate and/or heat tissue at or near a treatment location. For example, neuromodulation in accordance with embodiments of the present technology can include delivering RF energy, pulsed electrical energy, microwave energy, optical energy, focused ultrasound energy (e.g., high-intensity focused ultrasound energy), and/or another suitable type of energy. An electrode or transducer used to deliver this energy can be used alone or with other electrodes or transducers in a multi-electrode or multi-transducer array.

Neuromodulation using focused ultrasound energy (e.g., high-intensity focused ultrasound energy) can be beneficial relative to neuromodulation using other treatment modalities. Focused ultrasound is an example of a transducer-based treatment modality that can be delivered from outside the body. Focused ultrasound treatment can be performed in close association with imaging (e.g., magnetic resonance, computed tomography, fluoroscopy, ultrasound (e.g., intravascular or intraluminal), optical coherence tomography, or another suitable imaging modality). For example, imaging can be used to identify an anatomical position of a treatment location (e.g., as a set of coordinates relative to a reference point). The coordinates can then entered into a focused ultrasound device configured to change the power, angle, phase, or other suitable parameters to generate an ultrasound focal zone at the location corresponding to the coordinates. The focal zone can be small enough to localize therapeutically-effective heating at the treatment location while partially or fully avoiding potentially harmful disruption of nearby structures. To generate the focal zone, the ultrasound device can be configured to pass ultrasound energy through a lens, and/or the ultrasound energy can be generated by a curved transducer or by multiple transducers in a phased array, which can be curved or straight.

Heating effects of electrode-based or transducer-based treatment can include ablation and/or non-ablative alteration or damage (e.g., via sustained heating and/or resistive heating). For example, a treatment procedure can include raising the temperature of target neural fibers to a target temperature above a first threshold to achieve non-ablative alteration, or above a second, higher threshold to achieve ablation. The target temperature can be higher than about body temperature (e.g., about 37° C.) but less than about 45° C. for non-ablative alteration, and the target temperature can be higher than about 45° C. for ablation. Heating tissue to a temperature between about body temperature and about 45° C. can induce non-ablative alteration, for example, via moderate heating of target neural fibers or of luminal structures that perfuse the target neural fibers. In cases where luminal structures are affected, the target neural fibers can be denied perfusion resulting in necrosis of the neural tissue. Heating tissue to a target temperature higher than about 45° C. (e.g., higher than about 60° C.) can induce ablation, for example, via substantial heating of target neural fibers or of luminal structures that perfuse the target fibers. In some patients, it can be desirable to heat tissue to temperatures that are sufficient to ablate the target neural fibers or the luminal structures, but that are less than about 90° C. (e.g., less than about 85° C., less than about 80° C., or less than about 75° C.).

CONCLUSION

This disclosure is not intended to be exhaustive or to limit the present technology to the precise forms disclosed herein. Although specific embodiments are disclosed herein for illustrative purposes, various equivalent modifications are possible without deviating from the present technology, as those of ordinary skill in the relevant art will recognize. In some cases, well-known structures and functions have not been shown and/or described in detail to avoid unnecessarily obscuring the description of the embodiments of the present technology. Although steps of methods may be presented herein in a particular order, in alternative embodiments the steps may have another suitable order. Similarly, certain aspects of the present technology disclosed in the context of particular embodiments can be combined or eliminated in other embodiments. Furthermore, while advantages associated with certain embodiments may have been disclosed in the context of those embodiments, other embodiments may also exhibit such advantages, and not all embodiments need necessarily exhibit such advantages or other advantages disclosed herein to fall within the scope of the present technology. Accordingly, this disclosure and associated technology can encompass other embodiments not expressly shown and/or described herein.

The methods disclosed herein include and encompass, in addition to methods of practicing the present technology (e.g., methods of making and using the disclosed devices and systems), methods of instructing others to practice the present technology. For example, a method in accordance with a particular embodiment includes forming a tubular jacket, resiliently deforming the jacket inwardly while passing the jacket through a channel of a band electrode, and positioning the jacket and a hypotube segment relative to one another so that the jacket is disposed around at least a portion of an outer surface of the hypotube segment. A method in accordance with another embodiment includes instructing such a method.

Throughout this disclosure, the singular terms "a," "an," and "the" include plural referents unless the context clearly indicates otherwise. Similarly, unless the word "or" is expressly limited to mean only a single item exclusive from the other items in reference to a list of two or more items, then the use of "or" in such a list is to be interpreted as including (a) any single item in the list, (b) all of the items in the list, or (c) any combination of the items in the list. Additionally, the terms "comprising" and the like are used throughout this disclosure to mean including at least the recited feature(s) such that any greater number of the same feature(s) and/or one or more additional types of features are not precluded. Directional terms, such as "upper," "lower," "front," "back," "vertical," and "horizontal," may be used herein to express and clarify the relationship between various elements. It should be understood that such terms do not denote absolute orientation. Reference herein to "one embodiment," "an embodiment," or similar formulations means that a particular feature, structure, operation, or characteristic described in connection with the embodiment can be included in at least one embodiment of the present technology. Thus, the appearances of such phrases or formulations herein are not necessarily all referring to the same embodiment. Furthermore, various particular features, structures, operations, or characteristics may be combined in any suitable manner in one or more embodiments of the present technology.

We claim:

1. A catheter comprising:
   an elongate shaft defining a longitudinal axis and comprising:
      a proximal segment comprising a proximal hypotube comprising a distal skive, wherein the proximal segment comprises an inner electrically insulative tube; and
      an intermediate segment attached to a distal portion of the proximal segment such that the distal skive extends longitudinally into a proximal portion of the intermediate segment; and
   a neuromodulation element connected to a distal portion of the intermediate segment.

2. The catheter of claim 1, wherein the proximal hypotube comprises at least one of stainless steel or nitinol.

3. The catheter of claim 1, wherein the intermediate segment comprises:
   an inner polymer layer;
   a metal braid; and
   at least one outer polymer layer, the metal braid being positioned between the inner polymer layer and the at least one outer polymer layer.

4. The catheter of claim 3, wherein the metal braid comprises stainless steel.

5. The catheter of claim 3, wherein the inner polymer layer comprises a polyimide and the at least one outer polymer layer comprises an inner polyimide layer and an outer polyether-block-amide layer.

6. The catheter of claim 1, wherein the intermediate segment is more flexible than the proximal segment.

7. The catheter of claim 1, wherein the proximal segment further comprises an outer jacket.

8. The catheter of claim 7, wherein the outer jacket comprises a polyether-block-amide.

9. The catheter of claim 8, wherein the outer jacket further comprises a polysiloxane.

10. The catheter of claim 1, wherein the neuromodulation element is movable from a low-profile delivery state to a radially expanded deployed state, the neuromodulation element including:
    an outer perimeter;
    a distal segment configured to have a first shape when the neuromodulation element is in the low-profile delivery state and a second shape when the neuromodulation element is in the radially expanded deployed state, the second shape being more helical than the first shape;
    a jacket disposed around at least a portion of an outer surface of the distal segment; and
    a plurality of electrodes, each electrode of the plurality of electrodes being seated around the jacket.

11. The catheter of claim 10, wherein the jacket of the neuromodulation element comprises a polymer.

12. The catheter of claim 10, wherein the distal segment comprises nitinol.

13. The catheter of claim 10, wherein the neuromodulation element defines a distally tapering tip.

14. The catheter of claim 10, further comprising electrical leads electrically connected to the plurality of electrodes, wherein the electrical leads extend longitudinally through the inner electrically insulative tube.

15. A catheter comprising:
    an elongate shaft defining a longitudinal axis and comprising:
       a proximal segment comprising a proximal hypotube comprising a distal skive; and
       an intermediate segment attached to a distal portion of the proximal segment such that the distal skive extends longitudinally into a proximal portion of the intermediate segment; and
    a neuromodulation element connected to a distal portion of the intermediate segment,
    wherein the intermediate segment comprises:
       an inner polymer layer;
       a metal braid; and
       at least one outer polymer layer, the metal braid being positioned between the inner polymer layer and the at least one outer polymer layer.

16. The catheter of claim 15, wherein the inner polymer layer comprises a polyimide and the at least one outer polymer layer comprises an inner polyimide layer and an outer polyether-block-amide layer.

17. A catheter comprising:
    an elongate shaft defining a longitudinal axis and comprising:
       a proximal segment comprising a proximal hypotube comprising a distal skive; and
       an intermediate segment attached to a distal portion of the proximal segment such that the distal skive extends longitudinally into a proximal portion of the intermediate segment; and
    a neuromodulation element connected to a distal portion of the intermediate segment,
    wherein the proximal segment further comprises an outer jacket.

18. The catheter of claim 17, wherein the outer jacket comprises a polyether-block-amide.

19. A catheter comprising:
    an elongate shaft defining a longitudinal axis and comprising:
       a proximal segment comprising a proximal hypotube comprising a distal skive; and
       an intermediate segment attached to a distal portion of the proximal segment such that the distal skive extends longitudinally into a proximal portion of the intermediate segment; and
    a neuromodulation element connected to a distal portion of the intermediate segment,
    wherein the neuromodulation element is movable from a low-profile delivery state to a radially expanded deployed state, the neuromodulation element including:
       an outer perimeter;
       a distal segment configured to have a first shape when the neuromodulation element is in the low-profile delivery state and a second shape when the neuromodulation element is in the radially expanded deployed state, the second shape being more helical than the first shape;
       a jacket disposed around at least a portion of an outer surface of the distal segment; and
       a plurality of electrodes, each electrode of the plurality of electrodes being seated around the jacket.

20. The catheter of claim 19, further comprising electrical leads electrically connected to the plurality of electrodes, wherein the proximal segment further comprises an electrically insulative tube, the electrical leads extending longitudinally through the electrically insulative tube.

\* \* \* \* \*